US008340594B2

(12) United States Patent
Lagorsse et al.

(10) Patent No.: US 8,340,594 B2
(45) Date of Patent: Dec. 25, 2012

(54) THERMALLY OPTIMIZED MICROWAVE CHANNEL MULTIPLEXING DEVICE AND SIGNALS REPETITION DEVICE COMPRISING AT LEAST ONE SUCH MULTIPLEXING DEVICE

(75) Inventors: Joël Lagorsse, Castanet Tolosan (FR); Jean-Claude Lacombe, Tournefeuille (FR)

(73) Assignee: Thales, Neuille-sur-Seine (FR)

( * ) Notice: Subject to any disclaimer, the term of this patent is extended or adjusted under 35 U.S.C. 154(b) by 258 days.

(21) Appl. No.: 12/870,827

(22) Filed: Aug. 29, 2010

(65) Prior Publication Data

US 2011/0058809 A1 Mar. 10, 2011

(30) Foreign Application Priority Data

Sep. 4, 2009 (FR) .................................... 09 04212

(51) Int. Cl.
*H04B 1/46* (2006.01)

(52) U.S. Cl. ........................................ 455/81; 333/202

(58) Field of Classification Search .................... 455/80, 455/81; 333/135, 202–212, 229, 248
See application file for complete search history.

(56) References Cited

U.S. PATENT DOCUMENTS

| | | | | |
|---|---|---|---|---|
| 5,428,323 | A * | 6/1995 | Geissler et al. | 333/135 |
| 2004/0124954 | A1 | 7/2004 | Strohecker et al. | |
| 2009/0153274 | A1 * | 6/2009 | Engel et al. | 333/229 |

* cited by examiner

*Primary Examiner* — Lee Nguyen
(74) *Attorney, Agent, or Firm* — Baker & Hostetler LLP

(57) ABSTRACT

A microwave channel multiplexing device comprises several elementary filters connected in parallel with a common output port by way of a transverse waveguide, each filter comprising a lower end fixed to a support common to all the filters and an upper end away from the support, an external peripheral wall, at least one internal cavity defining an internal channel, a signal input connected to the internal cavity and a signal output connected to the transverse waveguide. The multiplexing device furthermore comprises a conducto-radiative device coupled mechanically and thermally to at least two filters, the conducto-radiative device comprising at least one thermally conducting plate, and linked to the external peripheral walls of each of said at least two filters, the plate being fixed at the level of the upper end of the filters. The invention applies to the field of satellite telecommunications and more particularly to signals repetition devices aboard satellites.

24 Claims, 9 Drawing Sheets

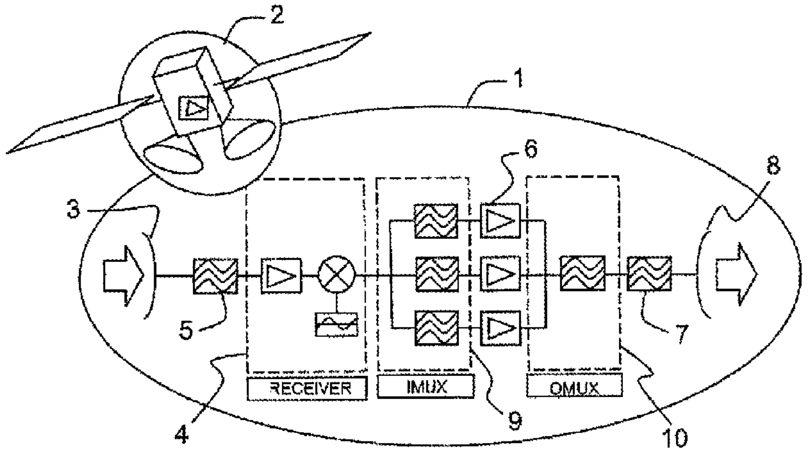
FIG.1 PRIOR ART
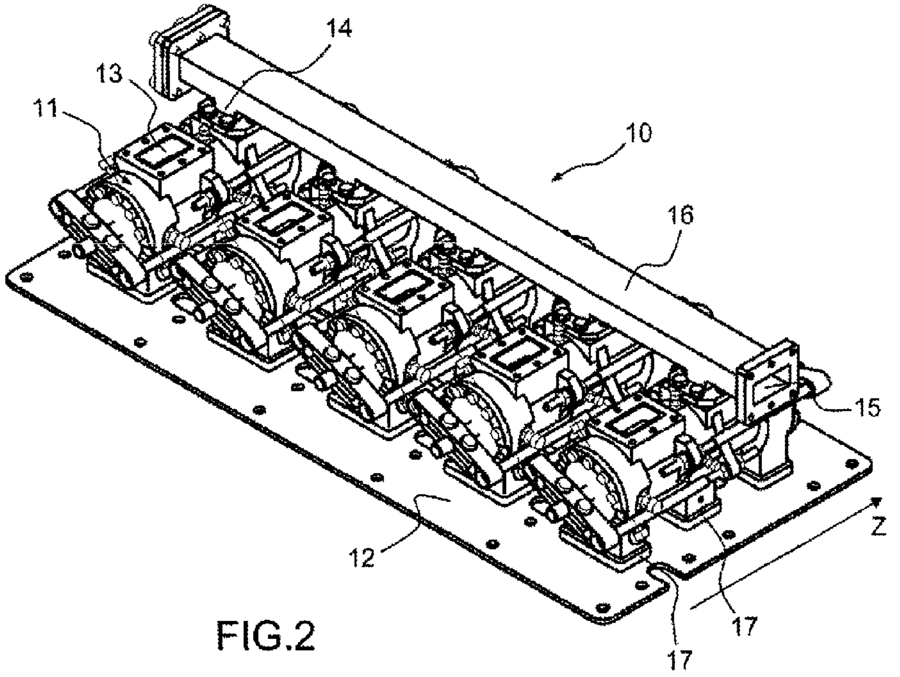
FIG.2
PRIOR ART

THERMALLY OPTIMIZED MICROWAVE CHANNEL MULTIPLEXING DEVICE AND SIGNALS REPETITION DEVICE COMPRISING AT LEAST ONE SUCH MULTIPLEXING DEVICE

CROSS-REFERENCE TO RELATED APPLICATIONS

This application claims priority to foreign France patent application No. 0904212, filed on Sep. 4, 2009, the disclosure of which is hereby incorporated by reference in its entirety.

FIELD OF THE INVENTION

The present invention relates to a thermally optimized microwave channel multiplexing device and to a signals repetition device comprising at least one multiplexing device. It applies notably to the field of satellite telecommunications and more particularly to signals repetition devices aboard satellites.

BACKGROUND OF THE INVENTION

As represented for example in FIG. 1, a repetition device 1 aboard a satellite 2 generally comprises microwave signal transmit and receive chains intended to convey, amplify and route the signals between a terrestrial station and users located in specific geographical zones. On reception, the signals received by the receive antenna 3 are sent to a receiver 4 by way of a receive filter 5 and then amplified by amplifiers 6 and re-transmitted, after passing through a transmit filter 7, by a transmit antenna 8. For technical amplification reasons, before amplification, the bandwidth of the signal received is divided into several sub-bands of reduced width equal to those of the user channels by way of a demultiplexing device 9 conventionally called an IMUX (for Input Multiplexor), and after amplification, the amplified signals are recombined into a single broadband signal. The recombining of the signals into a single output broadband signal is generally carried out by means of an output multiplexing device 10 conventionally called an OMUX (for Output Multiplexor) which comprises several elementary filters 11, each elementary filter having a predefined central frequency and bandwidth.

As represented for example in FIG. 2, each filter 11 comprises a signal input 13 and a signal output 14, the filters being connected in parallel with a common output port 15 by way of a transverse waveguide 16, called a manifold, which links together the outputs 14 of all the channels. Each filter 11 comprises at least one resonant internal cavity or several resonant internal cavities coupled together, for example by way of coupling irises so as to form a channel in which the RF radiofrequency signals travel.

The various filters 11 of the OMUX are conventionally fixed horizontally and in parallel to one another on a thermally conducting, and generally metallic, common support 12 in such a way that the longitudinal axis Z of each channel is substantially parallel to the plane of the support 12. The longitudinal walls of each cavity are then in contact with the support 12, either directly or by way of fixing brackets 7 thereby making it possible, by thermal conduction, to be able to remove the thermal energy dissipated by the cavities of the filter 11 to the support 12. Conventionally, the thermal flux crosses the support 12 perpendicularly to the filter 11 toward heat pipes disposed on a panel of the satellite.

In the nominal operating mode corresponding to operation of the filter in the frequency band for which it is dimensioned, this thermal energy is essentially due to losses by skin effects due to a Joule effect in the walls of the filter, these losses being dissipated by conduction from the interior to the exterior of the filter. In an operating mode called "off-band" corresponding to an anomaly in the transmission frequency around a filter of the OMUX, the filter operates outside of the frequency band for which it is dimensioned. In this off-band operating mode, the filter absorbs and dissipates a large part of the energy of the signal. The power dissipated by the filter in the off-band operating mode is of the order of three higher than in the nominal operating mode. In the case where the OMUX is of the thermocompensated type and where each filter comprises a flexible membrane making it possible to control the volume of the cavity and thus to adjust the operating frequency as a function of temperature, this large power dissipation can have a penalizing effect on the flexible membrane since this part is highly resistive and generates strong temperature gradients.

The channels of the filters of an OMUX are therefore always dimensioned thermally with respect to the off-band mode.

A horizontal architecture of the OMUX is very suitable for the control of the thermal gradients of the channels, but remains limiting for meeting the new requirements encountered within the framework of space applications since, on the one hand, in the case of an application requiring very large powers, greater than or equal to 500 W, this architecture generates significant thermal flux densities at the interfaces of the off-band channel on the heat pipes of the panel of the satellite, which means there is a risk of these heat pipes drying out; on the other hand, this architecture requires a large installation footprint in the plane of the support, this being penalizing in the case of an arrangement of payloads in a very limited bulk.

To solve the problem of the flux density constraints on the heat pipes, it is conventional to develop overdimensioned heat pipes, thereby penalizing the arrangement of the payload of the satellite.

To solve the problem of the OMUX bulk and to optimize its installation, the vertical architecture may be preferred to the horizontal architecture, but it causes much more significant thermal gradients than those obtained with a horizontal architecture. Currently, a known solution for solving this thermal gradient problem consists in increasing the conductive cross section of each channel by increasing the thickness of the walls of each filter. However this requires consequent additional material which significantly increases the mass of the OMUX, this being penalizing, or indeed prohibitive, for space applications.

The aim of the invention is to produce a microwave channel multiplexing device optimized in mass making it possible to decrease the thermal flux density at the interface of the off-band channel, notably in the case of an application requiring very large powers.

SUMMARY OF THE INVENTION

For this purpose, the invention relates to a microwave channel multiplexing device comprising several elementary filters connected in parallel with a common output port by way of a transverse waveguide, each filter comprising a lower end fixed to a support common to all the filters and an upper end away from the support, an external peripheral wall, at least one internal cavity defining an internal channel, a signal input connected to the internal cavity and a signal output connected to the transverse waveguide, characterized in that it furthermore comprises a conducto-radiative device coupled mechanically and thermally to at least two filters, the conducto-radiative device comprising at least one thermally conducting plate and linked to the external peripheral walls of each of said at least two filters, the plate being fixed at the level of the upper end of the filters.

Advantageously, the plate comprises recesses cooperating with the external peripheral walls of said at least two filters in such a way that the external peripheral walls of said filters fit within a corresponding recess of the plate.

Preferably, each filter comprises an external annular collar secured to the external peripheral wall and the plate is mounted and fixed to the collars of said at least two filters.

According to one embodiment, the upper end of each filter comprises a lid for closing the longitudinal channel and the plate is fixed between the annular collar and the lid of said at least two filters.

Advantageously, the plate may be equipped with mini-heat pipes comprising a conducting material wall furnished with a circuit for circulating a heat-carrying fluid.

According to one embodiment, the plate can comprise two distinct walls, respectively lower and upper, and mini-heat pipes fixed between the two walls.

Advantageously, the plate is made of a thermal conducting material chosen from among metallic materials or composite materials with metallic matrix reinforced with conducting fibers.

The conducto-radiative device can comprise a single thermally conducting plate, linked and fixed to the external peripheral walls of all the filters.

Alternatively, the conducto-radiative device can comprise at least two thermally conducting plates linked respectively to the external peripheral walls of a first set of at least two filters and of a second set of at least two filters. In the case where the conducto-radiative device comprises two plates, the two plates may be mutually thermally coupled.

According to one embodiment, the elementary filters are disposed in parallel on a common support and have their longitudinal axis perpendicular to the common support and the conducto-radiative device is coupled thermally to a single cavity of each channel of the filters.

According to another embodiment, the elementary filters are disposed in parallel on a common support and have their longitudinal axis parallel to the common support and the conducto-radiative device is coupled thermally to all the cavities of each channel of the filters.

The invention also relates to a signals repetition device comprising at least one such multiplexing device.

BRIEF DESCRIPTION OF THE DRAWINGS

Other features and advantages of the invention will be clearly apparent in the subsequent description given by way of purely illustrative and nonlimiting example, with reference to the appended schematic drawings which represent:

FIG. 1: a basic diagram of an exemplary signals repetition device;

FIG. 2: a diagram of an exemplary microwave channel multiplexing device with horizontal architecture, according to the prior art;

DETAILED DESCRIPTION

Figure 3:
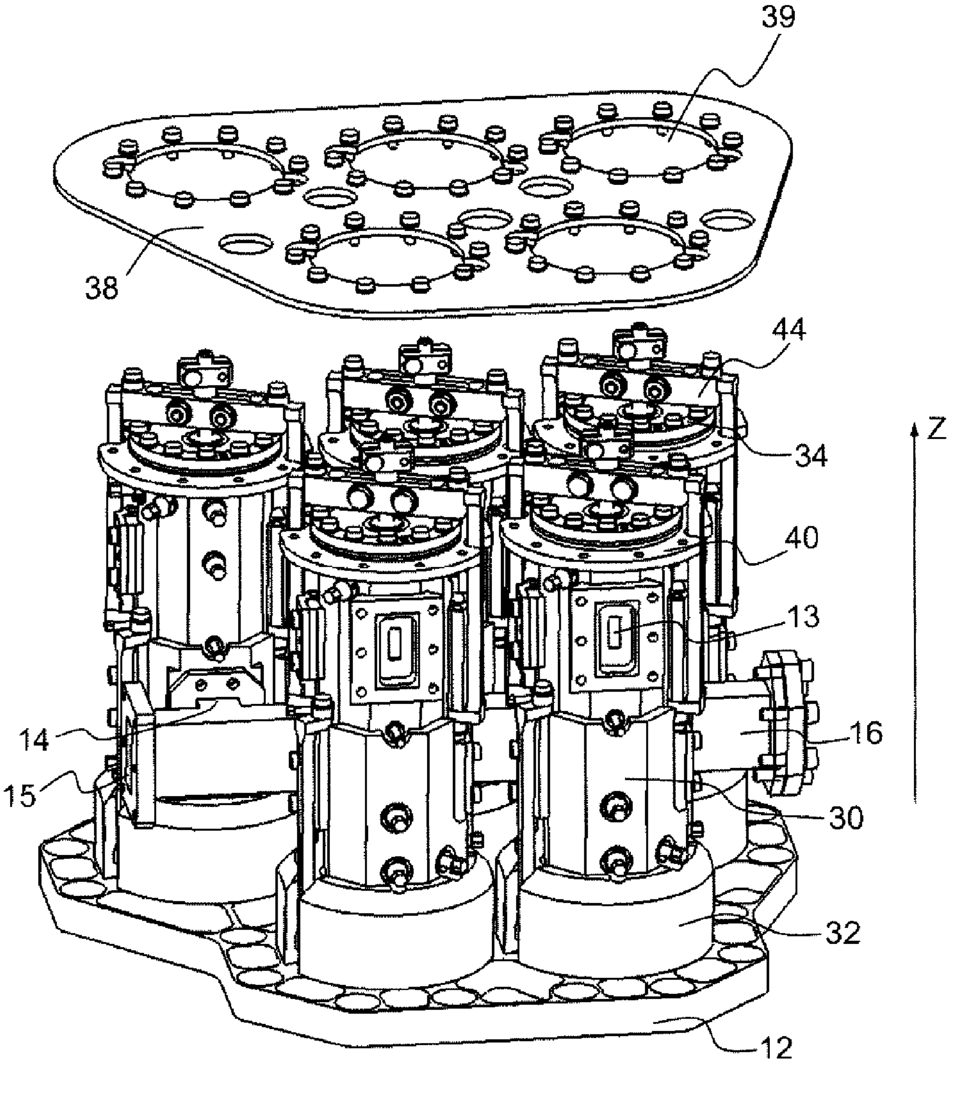
FIG. 3: a diagram, during assembly, of an exemplary thermally optimized microwave channel multiplexing device with vertical architecture, according to the invention.
Figure 4A:
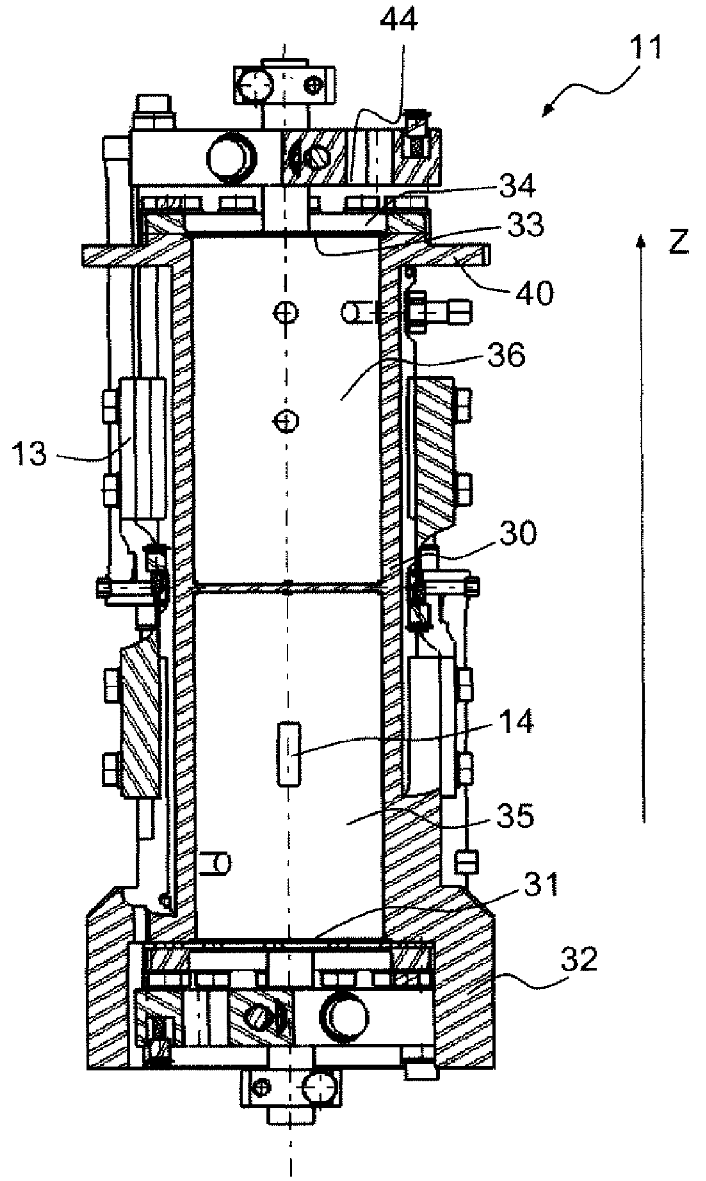
FIG. 4*a*: a schematic cross-sectional view of an exemplary filter for an OMUX comprising two cavities, according to the invention.
Figure 4B:
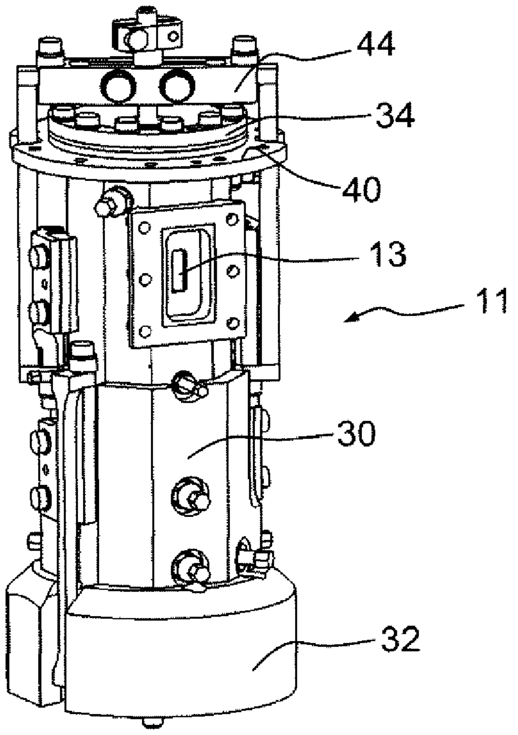
FIGS. 4*b* and 4*c*: two schematic profile views of an exemplary filter for an OMUX, according to the invention.
Figure 4C:
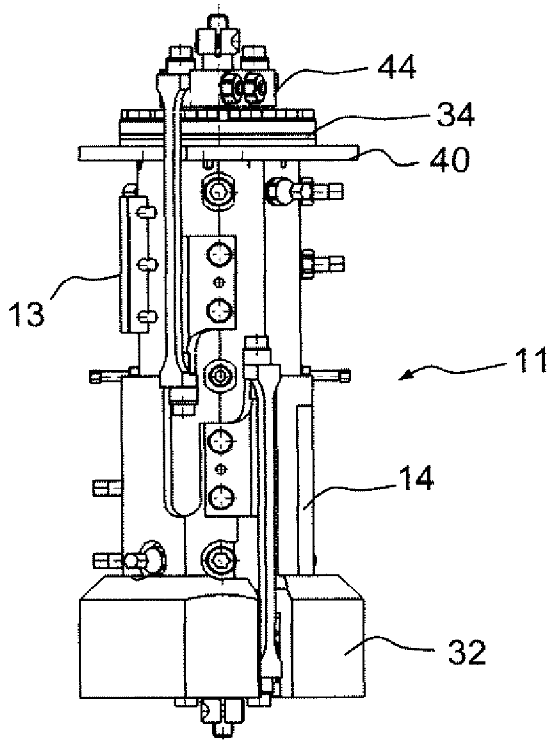

The microwave channel multiplexing device, called an OMUX, represented in the example of FIG. 3 comprises a set of five filters 11 disposed according to a vertical architecture of the channels. Each filter 11 represented in detailed view in FIGS. 4*a*, 4*b* and 4*c* comprises, according to a longitudinal axis Z, an external peripheral wall 30, a lower end 31 positioned in a plinth 32, an upper end 33 comprising an upper closure lid 34, the lid 34 possibly being furnished with a flexible and deformable part and with a fixing collar, and at least one internal cavity 35, 36 disposed between the two ends 31, 33. In the nonlimiting example of FIG. 4*a*, the filter represented comprises two internal cavities 35, 36 superposed along the Z axis. On variants of filter topologies, the number and the geometry of the cavities may be different. It is for example possible to use a filter with three cavities, two of which are aligned along the Z axis and the third coupled on one side, orthogonally to the Z axis. The two internal cavities are coupled together electrically by irises, not represented. The filter 11 comprises an input interface 13 for an RF radiofrequency signal linked to the upper cavity 36 and an output interface 14 for an RF radiofrequency signal connected to the lower cavity 35. The plinths 32 of each filter 11 of the OMUX are fixed to a common support 12 in such a way that the longitudinal axis of each filter is substantially perpendicular to the support. Each filter operates on a predefined central frequency, differing from one filter to another of the OMUX. According to the type of technology chosen, the filter may be made of a material with a low thermal expansion rate such as Invar, or the filter can optionally be temperature compensated, and/or optionally comprise a dielectric resonator. In the example of FIGS. 4*b* and 4*c*, the filter represented is thermo-compensated, the lid 34 of each filter 11 comprising a temperature compensation device 44 making it possible to automatically modify the volume of the internal cavities 35, 36 of the filter 11 as a function of the temperature so as to stabilize the operating frequency of the filter.

This vertical architecture exhibits the advantage of being more compact from the standpoint of the support 12 than a horizontal architecture but comprises the drawback, however, in the case where the number of cavities of each filter is greater than one, of having only the lower cavity 35 in contact with the support 12 and it is difficult to remove the heat of the parts furthest from the support 12. Indeed, the thermal flux arising from the energy dissipation in the upper cavity 36 must travel through the lower cavity 35 before being removed in the support 12. The lower cavity 35 in contact with the support 12 must therefore absorb its own thermal flux and the thermal flux dissipated by the upper cavity 36, thereby generating heavy constraints from the standpoint of the thermal control of the channel. This vertical architecture therefore exhibits significant thermal gradients which take a considerably augmented magnitude when one of the filters is situated in an off-band operating mode. In this case, the high parts of the off-band channel reach very high temperatures while the channels adjacent to this off-band channel, operating in a nominal mode, remain at much lower temperatures.

To improve the diffusion of the thermal fluxes and decrease the thermal gradients in the OMUXs in the off-band mode, the invention consists in mechanically and thermally coupling the channels together, preferably at the level of their hottest part, and in increasing the radiative exchanges to the environment outside the OMUX. The exemplary embodiment represented in FIG. 3 relates to the most critical case of a vertical architecture of the channels, but the invention can also apply to a horizontal architecture in the case of an application requiring very large powers, as represented in the example of FIG. 8.

Figure 5:
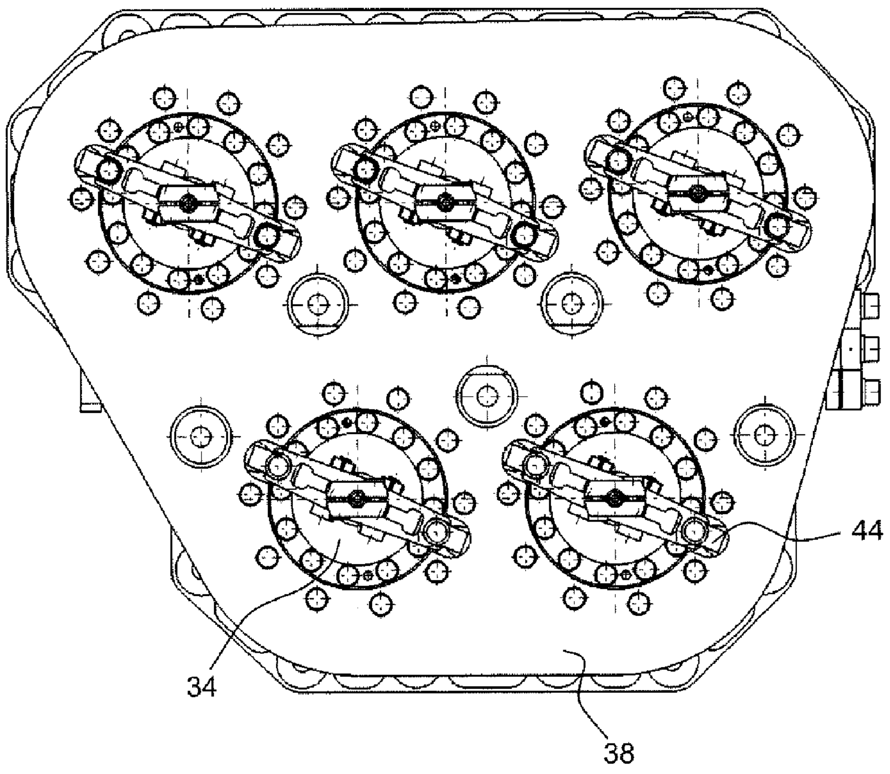
FIG. 5: a detailed diagram from above of an OMUX with vertical architecture furnished with a conducto-radiative plate, according to the invention.
Figure 6A:
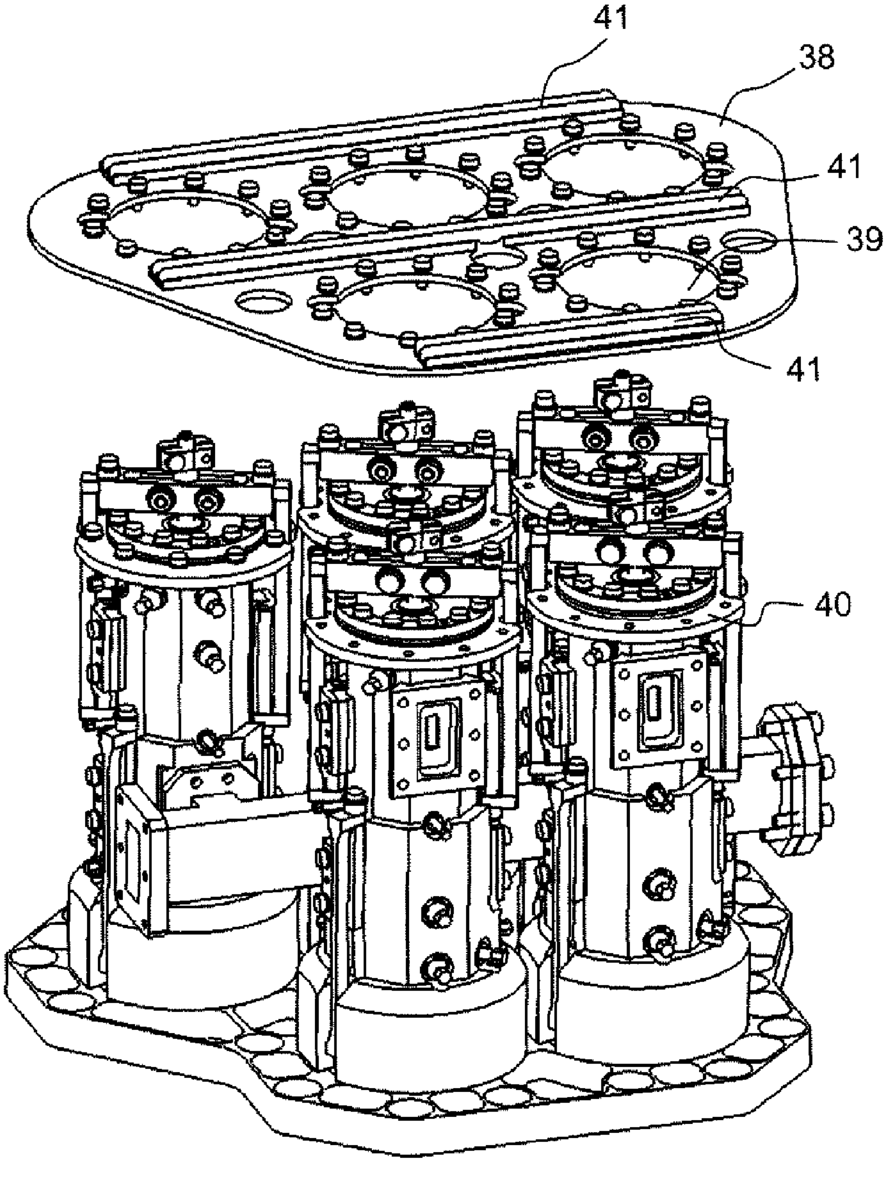
FIGS. 6*a*, 6*b*: two diagrams, during assembly and assembled, of a variant embodiment of the thermally optimized microwave channel multiplexing device with vertical architecture, according to the invention.
Figure 6B:
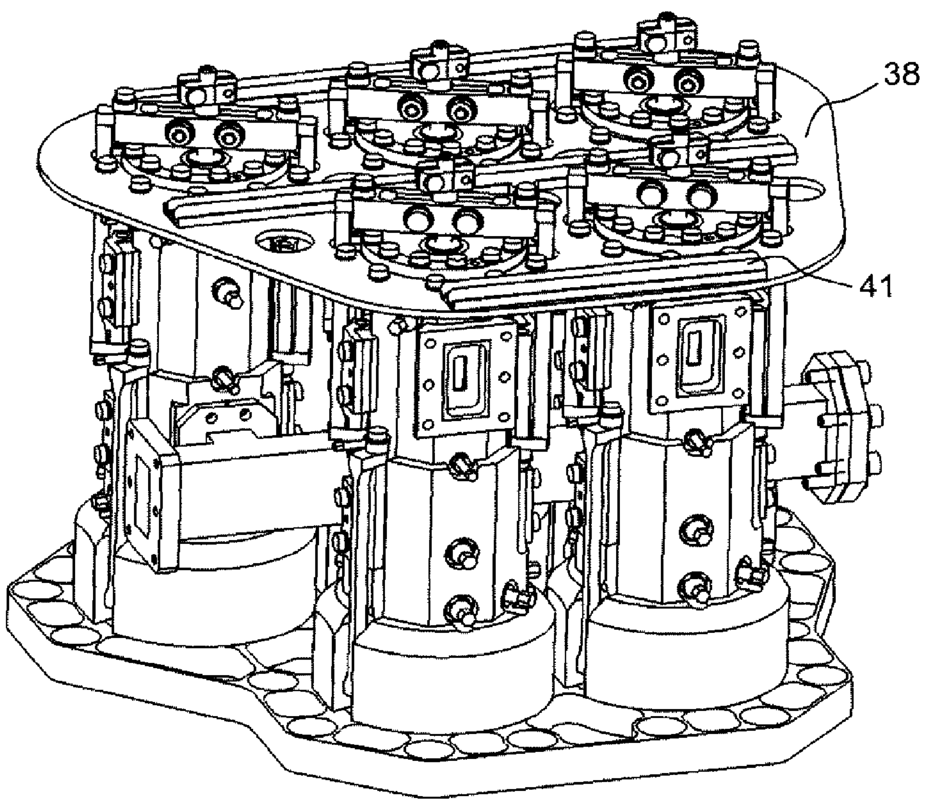
Figure 7A:
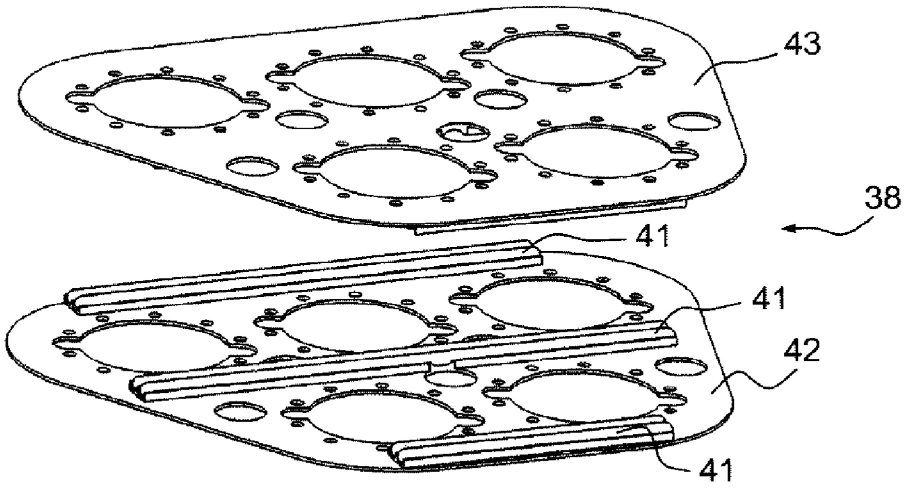
FIGS. 7*a*, 7*b*: two schematic detail views in perspective and in transverse section, of a variant embodiment of a conducto-radiative plate, according to the invention.
Figure 7B:
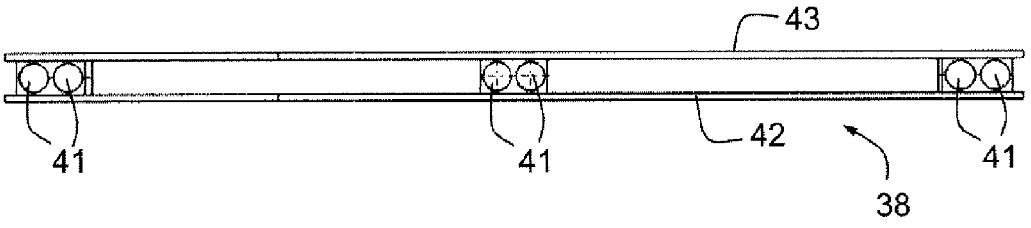

In the example of FIG. 3, the hottest part is the upper part of the channels at the level of the lid 34 closing the upper cavity 36 of each filter 11. The invention consists in fixing a conducto-radiative device comprising at least one thermally conducting plate 38 on the external peripheral walls 30 of the filters. According to the embodiment represented in FIG. 3, the plate 38, called a conducto-radiative plate, comprises recesses 39 passing through the whole of its thickness, the recesses cooperating with the external peripheral walls of each filter 11 in such a way that the external peripheral walls 30 of each filter 11 fit within a corresponding recess 39 of the plate 38. Advantageously, an external annular collar 40 is arranged on the external peripheral walls of each filter, for example at the upper end 33 of the channel of each filter 11, the collars 40 of all the filters being located in one and the same plane substantially parallel to the plane of the support 12, and the plate 38 is assembled onto and fixed to the collars 40. The plate 38 then covers all the collars 40 of the filters 11 of the OMUX as represented in FIG. 5 and is thus in contact with the peripheral walls of each filter. The conducto-radiative plate 38 is made of a thermal conducting material, metallic or composite, such as for example aluminum which exhibits the advantage of low density associated with good thermal conductivity relative to other metallic materials, or a composite material with metallic matrix reinforced with highly conducting fibers. The conducto-radiative plate 38 comprises recesses 39 disposed opposite the channels of each filter 11, the recesses 39 being of slightly greater dimensions than the diameter of each channel so that the plate 38 fits around the walls 30 of the channels and rests on each collar 40. The fixing of the conducto-radiative plate 38 onto the collars 40 may be carried out with any fixing means such as for example with screws. The fixing of the lids 34 and of the optional temperature compensation devices 44 is thereafter carried out at the end of each channel, above the conducto-radiative plate 38. In this configuration, a single cavity 36 of each filter 11, corresponding to the input cavity of the radiofrequency signals, is linked to the conducto-radiative plate 38 and coupled thermally to this plate 38. The plate 38 being in contact with the external peripheral walls 30 of all the channels on the upper part, this makes it possible to thermally couple all the channels together on their hottest part and to direct, by thermal conduction in the peripheral walls 30 of the filters, the thermal flux of a channel which operates in off-band mode toward the much colder channels which operate in nominal mode and then act as thermal sinks. The conducto-radiative plate 38 having a larger external surface area than the area occupied by the aggregated upper part of all the channels, also makes it possible to increase the radiative area of the various channels of the OMUX 10 and to increase the share of the overall radiative thermal flux of the OMUX 10 to its environment. To increase the exchanges by conduction and radiation and to diffuse the thermal flux in a homogeneous manner throughout the plate 38, the conducto-radiative plate 38 can comprise heat pipes 41 brazed or glued onto its exterior surface as represented in FIGS. 6*a* and 6*b*. Alternatively, as represented in FIGS. 7*a* and 7*b*, the conducto-radiative plate 38 can comprise two distinct walls 42, 43, respectively lower and upper, substantially mutually parallel and the heat pipes 41 be fixed between the two walls 42, 43 of the plate 38. The heat pipes 41 are preferably chosen from among micro-heat pipes or mini-heat pipes comprising a conducting material wall furnished with a circuit for circulating a heat-carrying fluid. For example the pair of materials constituting the wall and the fluid of the heat pipe may be chosen from among the pair copper and water, or the pair aluminum and ethanol, or the pair aluminum and methanol. The mini-heat pipes and the micro-heat pipes made with these pairs of materials exhibit the advantage of being very insensitive to gravity and of being able to operate in any position and in particular in the vertical position notably for ground tests.

Figure 8:
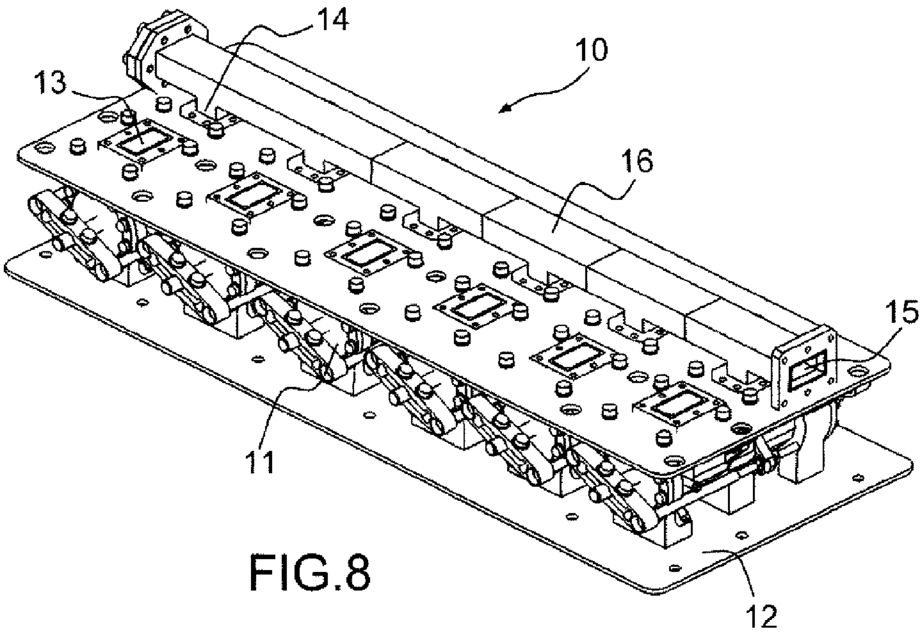
FIG. 8: a diagram of an exemplary thermally optimized microwave channel multiplexing device with horizontal architecture, according to the invention.

In the exemplary embodiment represented in FIG. 8, the various filters 11 of the OMUX 10 are fixed horizontally and in parallel with one another on a common support 12 in such a way that the longitudinal axis Z of each filter is substantially parallel to the plane of the support 12, the support constituting the lower part of the OMUX. A conducto-radiative plate 38 is assembled on and fixed to the longitudinal walls of the filters 11 so as to be substantially parallel to the plane of the support 12, on the upper part of the OMUX away from the support 12. The filters of the OMUX are then disposed between the support 12 and the conducto-radiative plate 38. The conducto-radiative plate 38 comprises recesses which hug the walls of the input orifices 13 and output orifices 14 of each filter 11. In this configuration, the two cavities 35, 36 of each filter 11 are linked to the conducto-radiative plate 38 and are therefore mutually thermally coupled.

Figure 9:
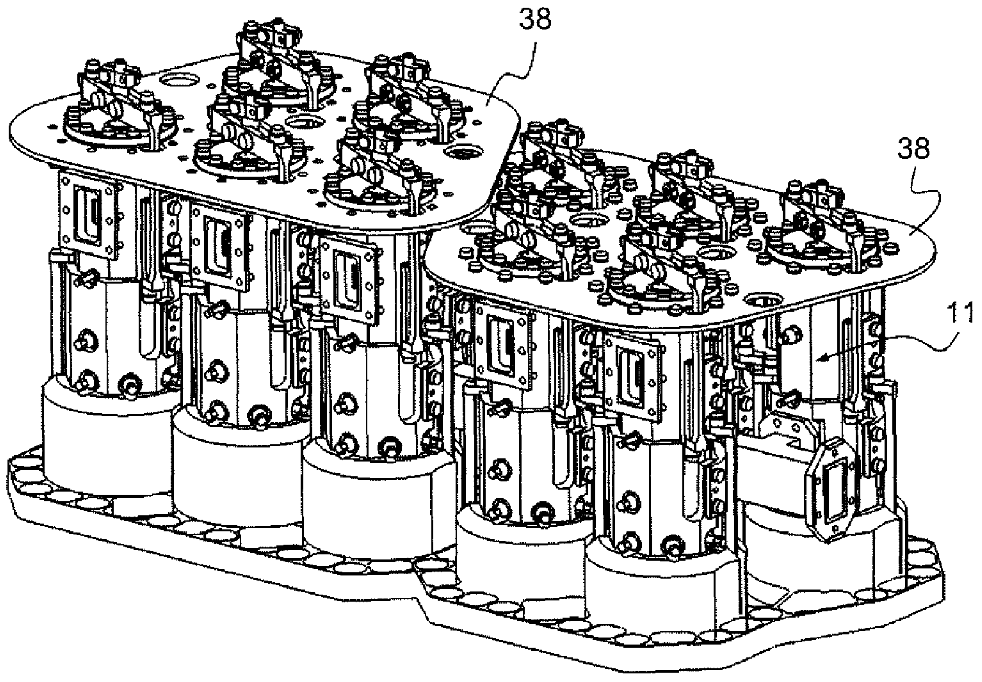
FIG. 9: a diagram of a variant embodiment of the thermally optimized microwave channel multiplexing device with vertical architecture comprising two conducto-radiative plates, according to the invention.

In the preferred embodiment of the invention, the conducto-radiative device comprises a single conducto-radiative plate 38 coupled to all the filters of the OMUX, but notably in the case of an application to an OMUX comprising substantially different length filters as represented in FIG. 9, it is also possible to use a conducto-radiative device comprising several conducto-radiative plates coupled respectively to a first set and to a second set of at least two filters of the OMUX. When the OMUX comprises several conducto-radiative plates 38, the various plates may be mutually thermally coupled or independent.

Although the invention has been described in conjunction with particular embodiments, it is very obvious that it is in no way limited thereto and that it comprises all the technical equivalents of the means described as well as their combinations if the latter enter within the framework of the invention.

The invention claimed is:

1. A microwave channel multiplexing device comprising several elementary filters connected in parallel with a common output port by way of a transverse waveguide, each filter comprising a lower end fixed to a support common to all the filters and an upper end away from the support, an external peripheral wall, at least one internal cavity defining an internal channel, a signal input connected to the internal cavity and a signal output connected to the transverse waveguide, which furthermore comprises a conducto-radiative device coupled mechanically and thermally to at least two filters, the conducto-radiative device comprising at least one thermally conducting plate, and linked to the external peripheral walls of each of said at least two filters, the plate being fixed at the level of the upper end of the filters.

2. A signals repetition device comprising at least one multiplexing device as claimed in claim 1.

3. The multiplexing device of claim 1, wherein the plate comprises recesses cooperating with the external peripheral walls of said at least two filters in such a way that the external peripheral walls of said filters fit within a corresponding recess of the plate.

4. A signals repetition device comprising at least one multiplexing device as claimed in claim 3.

5. The multiplexing device of claim 3, wherein each filter comprises an external annular collar secured to the external peripheral wall and wherein the plate is mounted and fixed to the collars of said at least two filters.

6. A signals repetition device comprising at least one multiplexing device as claimed in claim 5.

7. The multiplexing device of claim 5, wherein the upper end of each filter comprises a lid for closing the longitudinal channel and wherein the plate is fixed between the annular collar and the lid of said at least two filters.

8. A signals repetition device comprising at least one multiplexing device as claimed in claim 7.

9. The multiplexing device of claim 7, wherein the plate is equipped with mini-heat pipes comprising a conducting material wall furnished with a circuit for circulating a heat-carrying fluid.

10. A signals repetition device comprising at least one multiplexing device as claimed in claim 9.

11. The multiplexing device of claim 9, wherein the plate comprises two distinct walls, respectively lower and upper, and which comprises mini-heat pipes fixed between the two walls.

12. A signals repetition device comprising at least one multiplexing device as claimed in claim 11.

13. The multiplexing device of claim 11, wherein the plate is made of a thermal conducting material chosen from among metallic materials or composite materials with metallic matrix reinforced with conducting fibers.

14. A signals repetition device comprising at least one multiplexing device as claimed in claim 13.

15. The multiplexing device of claim 13, wherein the conducto-radiative device comprises a single thermally conducting plate, linked and fixed to the external peripheral walls of all the filters.

16. A signals repetition device comprising at least one multiplexing device as claimed in claim 15.

17. The multiplexing device of claim 13, wherein the conducto-radiative device comprises at least two thermally conducting plates linked respectively to the external peripheral walls of a first set of at least two filters, and of a second set of at least two filters.

18. A signals repetition device comprising at least one multiplexing device as claimed in claim 17.

19. The multiplexing device of claim 17, wherein the two plates are mutually thermally coupled.

20. A signals repetition device comprising at least one multiplexing device as claimed in claim 19.

21. The multiplexing device of claim 19, wherein the elementary filters are disposed in parallel on a common support and have their longitudinal axis (Z) perpendicular to the common support and wherein the conducto-radiative device is coupled thermally to a single cavity of each channel of the filters.

22. A signals repetition device comprising at least one multiplexing device as claimed in claim 21.

23. The multiplexing device of claim 19, wherein the elementary filters are disposed in parallel on a common support and have their longitudinal axis (Z) parallel to the common support and wherein the conducto-radiative device is coupled thermally to all the cavities of each channel of the filters.

24. A signals repetition device comprising at least one multiplexing device as claimed in claim 23.

* * * * *